United States Patent
Plunk

(10) Patent No.: US 6,752,513 B2
(45) Date of Patent: Jun. 22, 2004

(54) RETROFIT RECESSED FLUORESCENT STRIP FIXTURE AND METHOD

(75) Inventor: Carlton Plunk, Saltillo, MS (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 09/865,833

(22) Filed: May 25, 2001

(65) Prior Publication Data

US 2001/0050850 A1 Dec. 13, 2001

Related U.S. Application Data

(60) Provisional application No. 60/209,925, filed on Jun. 7, 2000.

(51) Int. Cl.[7] .................................................. F21S 8/06
(52) U.S. Cl. ....................... 362/150; 362/148; 362/217; 362/446
(58) Field of Search ................................. 362/147, 148, 362/150, 217, 219, 220, 221, 222, 225, 227, 249, 362, 368, 365, 364, 257, 260, 296, 310, 317, 341, 347, 383, 396, 404, 433, 446

(56) References Cited

U.S. PATENT DOCUMENTS

| | | | | |
|---|---|---|---|---|
| 3,058,611 A | * | 10/1962 | Chester | 220/3.5 |
| 3,790,774 A | * | 2/1974 | Miller et al. | 362/220 |
| 4,238,815 A | * | 12/1980 | Price | 362/218 |
| 4,928,209 A | * | 5/1990 | Rodin | 362/217 |
| 5,161,878 A | | 11/1992 | Degelmann et al. | |
| 5,274,533 A | * | 12/1993 | Neary et al. | 362/221 |
| 5,371,661 A | * | 12/1994 | Simpson | 362/219 |
| 5,412,551 A | * | 5/1995 | Newell | 359/850 |
| 5,440,466 A | | 8/1995 | Belisle et al. | |
| 6,027,230 A | | 2/2000 | Huber et al. | |
| 6,059,424 A | * | 5/2000 | Kotloff | 362/220 |
| 6,210,019 B1 | * | 4/2001 | Weathers | 362/220 |

* cited by examiner

Primary Examiner—Alan Cariaso
Assistant Examiner—Ismael Negron
(74) Attorney, Agent, or Firm—Middleton Reutlinger

(57) ABSTRACT

A retrofit fixture for installation into an existing recessed fluorescent strip fixture in an inverted T-bar grid ceiling. The retrofit fixture length is less than the length of the ceiling opening, except for hangar tabs which extend from a flange along a longitudinal edge. The fixture may be hung from the ceiling grid members by the tabs while wiring connections are made, and then swung into place. Lamps having a combined length greater than the length of the ceiling opening may be used by placing the lamp holders in a staggered arrangement.

18 Claims, 6 Drawing Sheets

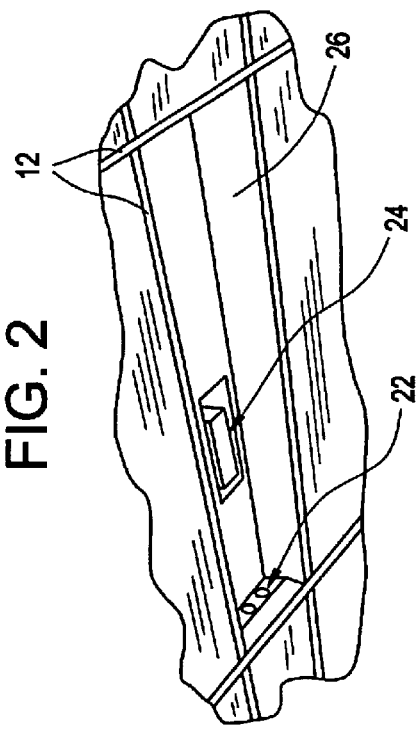
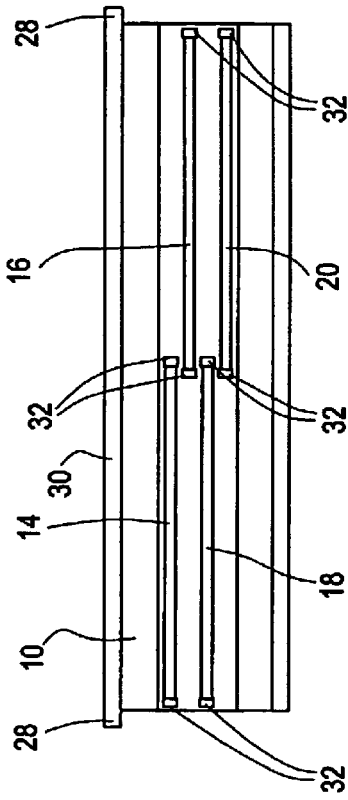

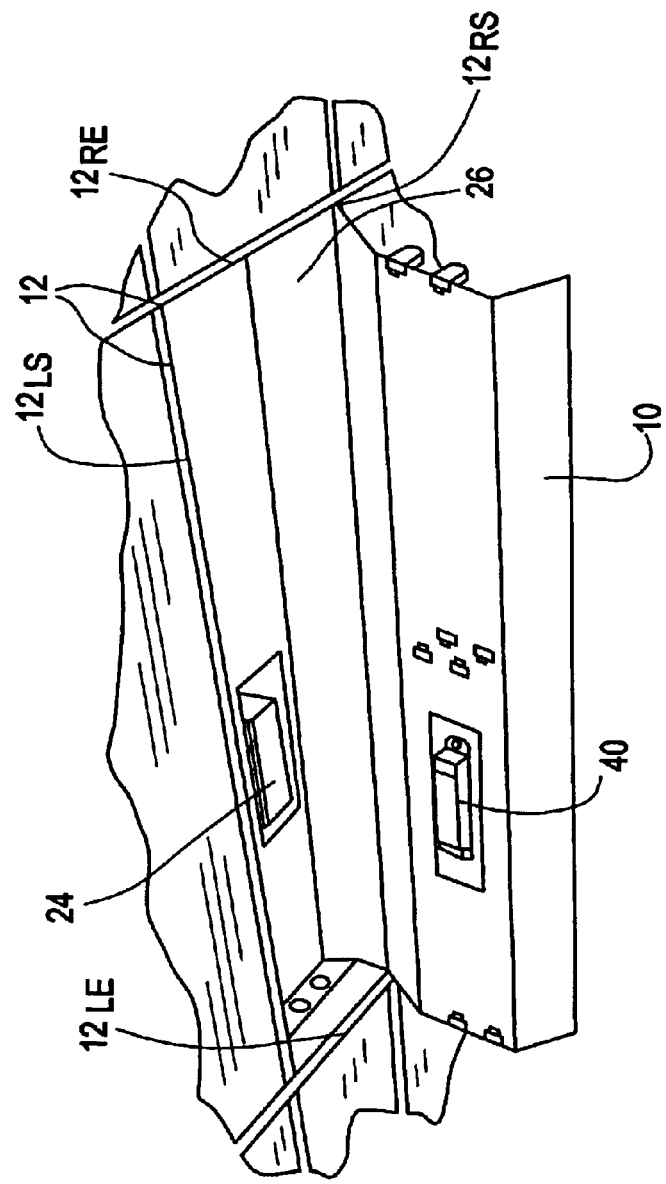

RETROFIT RECESSED FLUORESCENT STRIP FIXTURE AND METHOD

BACKGROUND OF THE INVENTION

1. Field of the Invention

The present invention relates to recessed fluorescent strip lighting fixtures. More particularly, this invention relates to a retrofit recessed fluorescent strip fixture which is easily installable from below the plane of the ceiling into existing recessed fluorescent strip lighting fixtures to enable the use of smaller, more efficient, brighter fluorescent light tubes with better color rendering.

2. Description of Prior Art

Higher efficiency, brighter fluorescent light tubes with better color rendering are the results of recent development in fluorescent lighting technology. Particularly, these developments have resulted in the availability of T-8 technology tubes with the performance described above. These developments have been of particular interest to large users of recessed strip fluorescent fixtures, such as department, grocery and other retail stores.

Strip fluorescent fixtures are commonly utilized in continuous rows to provide economical uniform lighting of large indoor spaces, such as retail stores. Recessing the fixtures above the plane of the ceiling provides for a 'cleaner' look and more visual comfort than 'open' strip fixtures. In the past, these fixtures typically utilized T-12 sized tubes in 8 foot lengths. The fixtures themselves typically measured 1 foot by 8 foot and were installed into inverted "T" (NEMA "G") ceiling systems.

Retail stores desire the ability to more efficiently and effectively illuminate their merchandise and their stores by utilizing the newer technology fluorescent light tubes. However, the newer technology tubes cannot be installed into existing strip fixtures as they require different lamp sockets and ballasts.

Replacement of existing fixtures would be very costly, requiring the purchase of completely new fixtures, wiring and construction costs of removing the old fixtures and installing the new fixtures, and, most importantly, the inconvenience and cost of closing down sections of the store as the construction proceeds creating a "hard hat area".

SUMMARY OF THE INVENTION

Thus, it is an object of the present invention to provide an economical retrofit recessed fluorescent strip fixture using T-8 technology tubes installable from below the plane of the ceiling into and utilizing the housing of older strip fixtures using T-12 sized tubes.

It is also an object of the present invention that the retrofit fixture utilize the wiring from the old fixture.

It is another object of the present invention that the retrofit fixture be easily installable by one person in a relatively short period of time without the use of fasteners or tools.

It is a further object of the present invention to provide a fixture that may be shipped and installed with lamps already in their sockets to further reduce installation time.

These and other objects are achieved through the use of a retrofit fixture which is installable into an existing recessed fluorescent strip fixture in an inverted T-bar grid ceiling. The retrofit fixture has a reflector sized to fit within the existing fixture and within a grid opening in the ceiling. Flanges are located along the longitudinal edges of the retrofit fixture, with one flange further having hangar tabs extending from its ends.

By making the reflector flexible about its longitudinal axis, the width of the reflector and the flanges may be reduced to an amount less than the width of the ceiling opening for installation, but return to a width where the flanges cooperate with the ceiling members to support the retrofit fixture within the existing fixture.

Lamp holders may be in a staggered arrangement on the reflector to support lamps having a combined length greater than the length of the ceiling opening.

All of the above outlined objectives are to be understood as exemplary only and many more objectives of the invention may be gleaned from the disclosure herein. Therefore, no limiting interpretation of the objectives noted are to be understood without further reading of the entire specification and drawings included herewith

DESCRIPTION OF THE DRAWINGS

FIG. 2 shows a perspective view of a T-12 recessed fluorescent strip fixture with the T-12 tubes and ballast cover removed.

FIG. 3 shows a bottom view of a T-8 retrofit recessed fluorescent strip fixture of the present invention.

FIG. 4 shows an end view of the fixture of FIG. 3.

FIG. 5 shows a perspective view of a T-8 retrofit recessed fluorescent strip fixture of the present invention hanging from a "T" bar ceiling grid under a T-12 recessed fluorescent strip fixture.

DESCRIPTION OF THE PREFERRED EMBODIMENT

Figure 1:
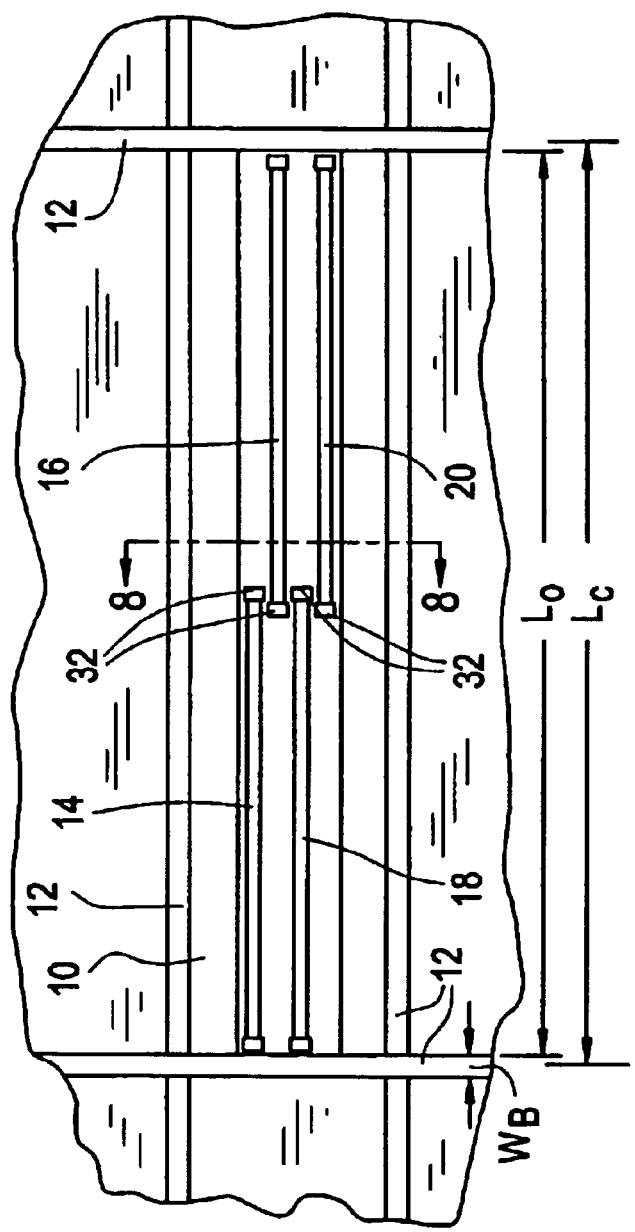
FIG. 1 shows a bottom view of a T-8 retrofit recessed fluorescent strip fixture of the present invention installed in a ceiling and old recessed fixture.

As shown in FIG. 1, the retrofit recessed fluorescent strip fixture of the preferred embodiment has a low profile reflector 10 which, when installed, is recessed above the plane of the ceiling. The ceiling plane is defined by an inverted "T" (NEMA "G") ceiling system having "T" bars 12 in a grid pattern.

Also shown in FIG. 1, the fixture of the preferred embodiment has 2 pairs of T-8 size fluorescent tubes 14, 16 and 18, 20, with each tube being one-half the length of the T-12 size tubes of the old fixture. In a typical 1 foot by 8 foot unit, the "T" bars 12 at the end of the fixture will be spaced 96 inches on-center $L_C$, with the length of the support portion of the "T" bar $W_B$ being 1 inch wide. Thus, the width of the opening between the end "T" bars $L_O$ is 95 inches. Further, any retrofit fixture installable from below the plane of the ceiling into the existing recessed fixture must have a length less than the width of the opening $L_O$.

The length of an 8 foot T-8 tube assembly, including the lamp holders, is approximately 96 inches. Since the tubes of fluorescent strip fixtures by design are parallel to the sides of the fixture, it is not possible to utilize an 96 inch tube assembly in the 95 inch opening $L_O$ available from below the plane of the ceiling.

The preferred embodiment, shown in FIG. 1, overcomes this limitation through the use of pairs of 48 inch T-8 tubes 14, 16 and 18, 20, held by lamp holders 32 and staggered such that the tube assembly ends overlap slightly at the center of the fixture. Thus, the retrofit fixture of the preferred embodiment will fit lengthwise in the 95 inch opening $L_O$.

The principles applied with respect to the 1 foot by 8 foot unit of the preferred embodiment apply equally to other common configurations, including 1 foot by 4 foot, and 1 foot by 16 foot configurations.

Installation of the T-8 retrofit fixture of the preferred embodiment into the T-12 fixture is illustrated in FIG. 2 through FIG. 5. The steps are as follows.

First, power must be disconnected to the T-12 fixture. Then the existing T-12 tubes, and the ballast cover of the T-12 fixture removed, leaving the T-12 lamp holders 22 and T-12 ballast 24 exposed within the T-12 fixture housing 26, as shown in FIG. 2.

As shown in FIG. 3, the retrofit fixture of the preferred embodiment has hangar tabs 28 extending from flange 30 located along a side edge of the retrofit fixture. Also shown in FIG. 3, the retrofit fixture of the present invention may be shipped and installed with the T-8 fluorescent tubes 14, 16, 18, and 20 already installed in T-8 lamp holders 32.

Electronic T-8 ballast 40 is attached to the top side of the reflector 10, as shown in FIG. 4.

The next installation step is to hang the retrofit fixture from the "T" bar grid 12 by hangar tabs 28. This can be accomplished by inserting the retrofit fixture side edge having the hangar tabs 28 to the T-12 fixture housing 26 diagonally across the opening in the "T" bar grid until the hangar tabs 28 are above the plane of the ceiling. Then the retrofit fixture can be straightened and pushed to the side, as shown in FIG. 5, so that the retrofit fixture will hang from hangar tabs 28 supported by the end "T" bars $12_{LE}$ and $12_{RE}$.

The hangar tabs 28 can be formed as a short extension of the 22 gauge material utilized for the reflector 10 and flange 30, extending approximately ½ inch long and ¼ in wide. When the fixture is hanging, as shown in FIG. 5, the hangar tabs 28 will be in shear, adequately supporting the weight of the retrofit fixture while the one-man installer makes the following wiring connections.

Figure 6:
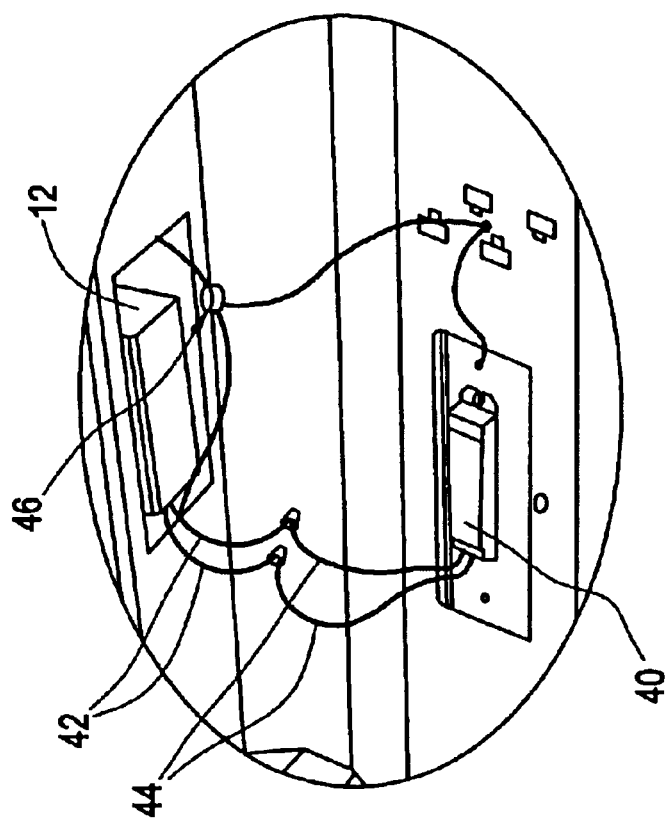
FIG. 6 shows a detail perspective view of the wiring of a T-8 retrofit recessed fluorescent strip fixture of the present invention to the wiring of a T-12 recessed fluorescent strip fixture.

As shown in FIG. 6, power supply leads 42 can be cut from the T-12 ballast 24 and attached to the power supply leads 44 from the T-8 ballast 40. Fixture and ballast grounds 46 from the T-12 and T-8 fixtures and ballasts can also be cut and attached.

Figure 7:
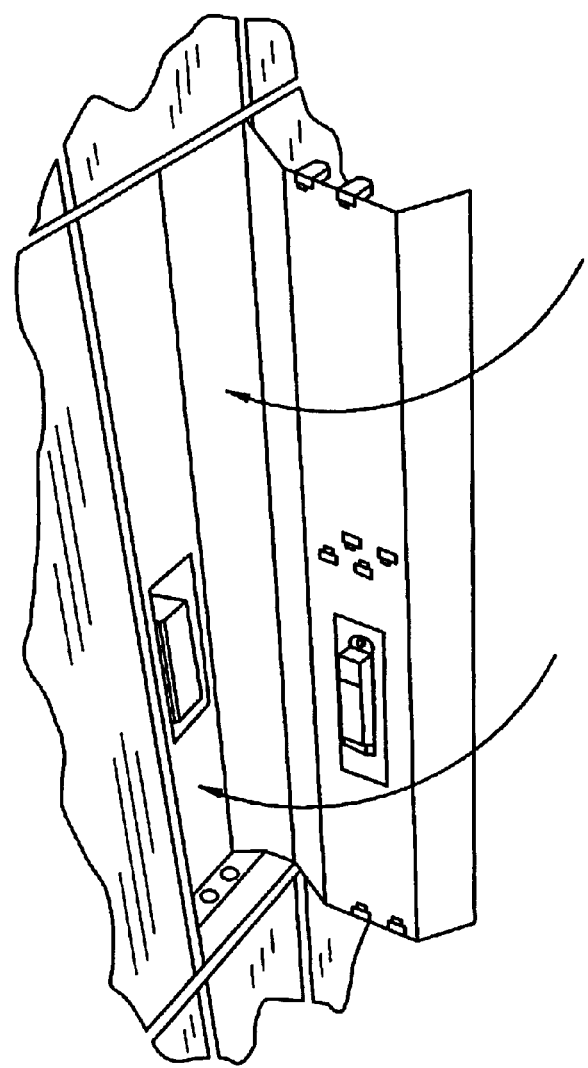
FIG. 7 is an illustration of the step of swinging a T-8 retrofit recessed fluorescent strip fixture of the present invention into position.
Figure 8:
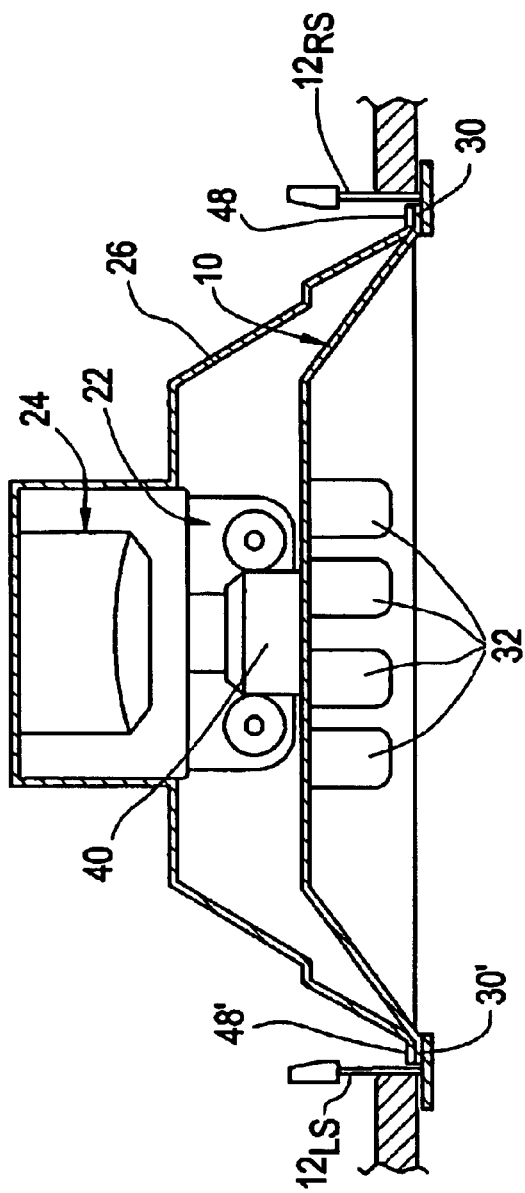
FIG. 8 shows a sectional view of the fixture taken along the line 8—8 of FIG. 1.

As shown in FIGS. 7 and 8, after the wiring connections are complete, the installer may then swing the retrofit fixture up into place transferring the weight of the fixture from the hangar tabs 28 to the flange 30 supported by the side "T" bar $12_{RS}$ as it is slid under the flange 48 of the T-12 fixture. The retrofit fixture reflector 10 may then be flexed just enough to slide flange 30' along the other side edge of the retrofit fixture between flange 48' of the T-12 fixture and the other side "T" bar $12_{LS}$.

As shown in FIG. 8 the depth of the older T-12 fixture housing 26 allows the low profile reflector 10 of the T-8 retrofit fixture, along with T-8 ballast 40, T-8 lamp holders 32 and T-8 fluorescent tubes 14, 16, 18 and 20 to be installed into the T-12 fixture, utilizing the T-12 fixture as its housing. This installation can be accomplished by one person from below the plane of the ceiling within a 5–8 minute time frame per unit. Because the T-12 fixture does not have to be removed, the retrofit can be accomplished with minimal disruption and expense.

This detailed description, and particularly the detailed measurements and component descriptions of the preferred embodiment, is given primarily for clearness of understanding and no unnecessary limitations are to be understood therefrom for modifications will become obvious to those skilled in the art upon reading this disclosure and may be made without departing from the spirit of the present invention.

What is claimed is:

1. A retrofit light fixture, comprising:
    a low profile reflector having a first side edge and a second side edge, said reflector being generally concave in shape;
    a ballast;
    a plurality of lamp holders connected electrically to said ballast;
    wherein said retrofit fixture fits within a reflector chamber of an existing light fixture and is retained therein; and
    wherein said plurality of lamp holders are in staggered offsetting relationship.

2. The retrofit light fixture of claim 1 wherein said plurality of lamp holders are further comprised of four pairs of opposing lamp connectors.

3. A retrofit light fixture in combination with an existing recessed fluorescent strip fixture in an inverted T-bar grid ceiling, comprising:
    an existing recessed fluorescent strip fixture reflector defining a reflector chamber;
    a retrofit reflector fitting within said existing recessed fluorescent strip fixture reflector chamber;
    wherein said retrofit reflector has:
        an elongated, concave, low profile shape;
        a first end;
        a second end opposed to said first end;
        a first side and a second side extending between said first end and said second end;
        a first hanger tab extending longitudinally from said first end;
        a second hanger tab extending longitudinally from said second end; and
        a plurality of paired lamp holders electrically connected to a ballast.

4. The retrofit light fixture of claim 3,
    wherein said existing fluorescent strip fixture reflector further has a first flange and a second flange located along its longitudinal edges;
    wherein said retrofit light fixture further has a first flange extending laterally from said first side and a second flange extending laterally from said second side;
    wherein said retrofit light fixture first flange is positioned between said existing fluorescent light fixture first flange and a first inverted T-bar grid member of said ceiling; and
    wherein said retrofit light fixture second flange is positioned between said existing fluorescent light fixture second flange and a second inverted T-bar grid member of said ceiling.

5. The retrofit light fixture of claim 3 wherein said existing fixture reflector has a first pre-defined length and wherein said retrofit reflector has a second pre-defined length, said second pre-defined length being less than said first pre-defined length.

6. The retrofit light fixture of claim 3 wherein said plurality of paired lamp holders are in a parallel arrangement.

7. A retrofit fixture for installation into an existing recessed fluorescent strip fixture in an inverted T-bar grid ceiling, said retrofit fixture comprising:
   a reflector sized to fit within said existing fixture and within a grid opening in said ceiling, said reflector having a first longitudinal edge, a second longitudinal edge, and a plurality of lamp holders;
   a plurality of lamps held by said lamp holders, each said lamp having a length less than the length of said ceiling grid opening;
   a first flange extending from said first longitudinal edge;
   a hanger tab extending from each end of said first flange;
   a second flange extending from said second longitudinal edge;
   wherein said lamp holders hold said lamps in a staggered arrangement.

8. The retrofit fixture of claim 7 wherein said lamps are T-8 fluorescent lamps.

9. A retrofit fixture for installation into an existing recessed fluorescent strip fixture in an inverted T-bar grid ceiling having an opening having a predetermined length and width, said retrofit fixture comprising:
   a reflector having a length less than said predetermined length, said reflector having a first longitudinal edge and a second longitudinal edge;
   a first flange extending from said first longitudinal edge;
   a hanger tab extending from each end of said first flange such that the length of said flange and said hanger tabs is greater than said ceiling opening predetermined length;
   a second flange extending from said second longitudinal edge; and
   a plurality of lamp holders attached to said reflector arranged to support at least one lamp.

10. The retrofit fixture of claim 9 wherein said plurality of lamp holders are in a staggered arrangement to support at least two lamps having a combined length greater said predetermined length.

11. The retrofit fixture of claim 9, said first flange and said second flange being supported by a first T-bar member and a second T-bar member, respectively, of said grid ceiling, said T-bar members being located along the respective sides of said ceiling opening, to support said retrofit fixture within said existing fixture.

12. The retrofit fixture of claim 11 wherein said reflector is flexible about its longitudinal axis, whereby the width of said reflector with said first and second flanges may be reduced to an amount less than said predetermined width of said ceiling opening.

13. A method of retrofitting an existing recessed fluorescent strip fixture installed above an opening in an inverted T-bar grid ceiling, said existing recessed fluorescent strip fixture having a reflector, fluorescent lamps, a ballast and power supply leads connected to said ballast, said existing fixture reflector having a ballast cover for accessing said ballast, said method of retrofitting comprising the steps of:
   a. removing said fluorescent lamps and said ballast cover from said existing recessed fluorescent strip fixture, and disconnecting said power supply leads from said ballast;
   b. partially inserting a retrofit fixture diagonally through said ceiling opening in said grid ceiling, said retrofit fixture comprising:
      a reflector sized to fit within an opening in said grid ceiling and within said existing fixture, said reflector having a first longitudinal edge and a second longitudinal edge, said reflector being flexible about its longitudinal axis;
      a first flange extending from said first longitudinal edge;
      a hanger tab extending from each end of said first flange;
      a second flange extending from said second longitudinal edge; and a retrofit ballast attached to said reflector;
   c. hanging said retrofit fixture from said T-bar members of said grid ceiling by said hanger tabs;
   d. attaching said power supply leads from said existing fixture to said retrofit ballast;
   e. swinging said retrofit fixture into place within said existing recessed fluorescent strip fixture by slightly flexing said retrofit fixture reflector such that the width of the retrofit fixture reflector combined with said first and second flanges may be reduced to an amount less than the width of said ceiling opening;
   f. allowing said reflector to return to its original width such that said retrofit fixture is supported by said T-bar ceiling grid members along said first and second flanges.

14. The retrofitting method of claim 13 wherein said retrofit fixture further has at least one pre-installed lamp.

15. An assembly for retrofitting a recessed fluorescent strip fixture where said recessed fluorescent strip fixture is recessed in an inverted T-bar grid ceiling, said assembly comprising:
   an elongated concave reflector having a first longitudinal edge and a second longitudinal edge;
   a first flange extending laterally outward from said first longitudinal edge, said first flange having a first end and an opposed second end;
   a first hanger tab extending longitudinally outward from said first end of said first flange; and
   a second hanger tab extending longitudinally outward from said second end of said first flange.

16. The assembly of claim 15 further comprising a plurality of lamp holders attached to said elongated concave reflector, wherein said plurality of lamp holders are in a staggered arrangement.

17. The assembly of claim 16 further comprising a second flange extending laterally outward from said second longitudinal edge of said reflector.

18. The assembly of claim 17 wherein said reflector is fabricated of a resilient material such that said reflector is flexible about its longitudinal axis.

* * * * *